(12) United States Patent
Bonds (10) Patent No.: US 7,604,766 B2
(45) Date of Patent: Oct. 20, 2009

(54) CORE METAL INSERT WITH STRESS RELIEF AND METHOD OF MAKING SAME

(75) Inventor: Roy L. Bonds, Valley City, OH (US)

(73) Assignee: Scovil Hanna Corporation, Cleveland, OH (US)

( * ) Notice: Subject to any disclaimer, the term of this patent is extended or adjusted under 35 U.S.C. 154(b) by 447 days.

(21) Appl. No.: 11/283,624

(22) Filed: Nov. 21, 2005

(65) Prior Publication Data
US 2006/0121241 A1   Jun. 8, 2006

Related U.S. Application Data

(60) Provisional application No. 60/632,385, filed on Dec. 2, 2004.

(51) Int. Cl.
*B29C 45/14* (2006.01)
*B32B 3/24* (2006.01)

(52) U.S. Cl. ............... 264/273; 264/274; 264/279; 264/279.1; 264/154; 264/138; 428/136; 428/122; 428/43; 29/6.1; 72/324

(58) Field of Classification Search ............... 428/136, 428/122, 43; 29/6.1; 72/324; 264/273, 274, 264/279, 279.1, 138, 154
See application file for complete search history.

(56) References Cited

U.S. PATENT DOCUMENTS

| | | |
|---|---|---|
| 2,290,842 A | 7/1942 | Bush |
| 3,222,769 A | 12/1965 | Le Plae |
| 3,241,219 A | 3/1966 | Hamm |
| 3,256,577 A | 6/1966 | Bright |
| 3,371,447 A | 3/1968 | Ruff et al. |
| 3,590,759 A | 7/1971 | Hendrie, Jr. et al. |
| 3,706,173 A | 12/1972 | Taylor |
| 3,781,183 A | 12/1973 | Doll |
| 3,934,385 A | 1/1976 | Paulus et al. |
| 4,074,465 A | 2/1978 | Bright |
| 4,099,765 A | 7/1978 | Bright |
| 4,188,424 A | 2/1980 | Ohno et al. |
| 4,196,546 A | 4/1980 | Bright |
| 4,304,816 A | 12/1981 | Bright et al. |
| 4,310,164 A | 1/1982 | Mesnel |
| 4,339,860 A | 7/1982 | Hayashi |
| 4,355,448 A | 10/1982 | Ezaki |
| 4,424,976 A | 1/1984 | Hayashi |
| 4,430,374 A | 2/1984 | Ezaki |
| 4,434,638 A * | 3/1984 | Sivachenko ............ 72/130 |
| 4,523,448 A | 6/1985 | Sakai et al. |
| 4,695,499 A | 9/1987 | Whitener |
| 4,745,665 A | 5/1988 | Hilsenbeck |
| 4,749,203 A | 6/1988 | Bright |
| 4,830,898 A | 5/1989 | Smith |
| 5,199,142 A | 4/1993 | Davis |

(Continued)

*Primary Examiner*—William P Watkins, III
(74) *Attorney, Agent, or Firm*—Pearne & Gordon LLP (57) ABSTRACT

A core metal insert is provided having a series, or multiple series, of laterally extending score marks in a non-reduced thickness portion, or portions, of the insert. Such score marks are provided in at least one face surface of the insert. The score marks provide stress relief so that when the corresponding precursor sheet metal blank is lengthened to produce the insert, the resulting insert will have a lesser tendency to contract from its lengthened state. A method of providing such a core metal insert also is provided.

22 Claims, 5 Drawing Sheets

U.S. PATENT DOCUMENTS

| | | |
|---|---|---|
| 5,249,353 A | 10/1993 | Kranz |
| 5,302,466 A | 4/1994 | Davis et al. |
| 5,651,218 A | 7/1997 | Bright et al. |
| 5,752,345 A | 5/1998 | Bright et al. |
| 5,783,312 A | 7/1998 | Laughman et al. |
| 5,871,682 A | 2/1999 | Kii et al. |
| 6,047,872 A | 4/2000 | Kii et al. |
| 6,079,160 A | 6/2000 | Bonds |
| 6,306,522 B1 | 10/2001 | Strutz et al. |
| 6,447,928 B2 | 9/2002 | Suitts |
| 6,532,787 B2 | 3/2003 | Suitts |
| 6,726,978 B2 | 4/2004 | Sehr |
| 6,877,349 B2 * | 4/2005 | Durney et al. .................. 72/324 |
| 6,889,985 B2 | 5/2005 | Bonds |
| 2002/0050547 A1 * | 5/2002 | Medlin et al. ............ 248/205.1 |
| 2004/0071922 A1 | 4/2004 | McCarthy et al. |

\* cited by examiner

CORE METAL INSERT WITH STRESS RELIEF AND METHOD OF MAKING SAME

This application claims the benefit of U.S. provisional patent application Ser. No. 60/632,385 filed Dec. 2, 2004, the contents of which are incorporated herein by reference.

BACKGROUND OF THE INVENTION

Core metal inserts for weatherseals generally are known. Various examples of core metal inserts are described in, e.g., U.S. Pat. Nos. 5,783,312, 5,871,682 and 6,079,160, the contents of each of which are incorporated herein by reference. The metal insert typically is coated or encapsulated by a suitable flexible material and bent to an appropriately shaped longitudinal contour to provide a particular weatherseal. The weatherseal has a longitudinally extending channel-shaped portion for gripping flange joints such as those that extend around openings in motor vehicles. The metal insert is provided in the weatherseal so that when bent into a channel (U-) shape cross-section, the embedded insert provides strength for gripping the flange joint to hold the weatherseal in place. The weatherseal can be fitted to an associated door or door frame, window or window frame, or other installation where it is desirable to provide a seal between an openable contrivance and its frame in the closed position.

To provide the above-mentioned flexible material over the metal insert, the insert is drawn through a coating extruder where a coating of such material is applied. Generally, the material is an elastomeric material, such as a natural or synthetic rubber or flexible foam, and is applied in an uncured or softened state over the metal insert. Following extrusion, the coating is caused or permitted to dry or cure, at which point the coating material becomes bound to the metal insert over their interfacial contact area.

During the process for manufacturing a weatherseal, the metal insert is made in part by lengthening a sheet metal blank, and is drawn through the coating extruder in tension. The coating material applied over the insert typically is cured or dried while the insert remains in tension. Conventionally, once the tension on the insert is released, the insert has a contractile tendency that causes it to contract from its lengthened state while embedded in the extrusion coating. This can result in at least two negative effects. First, contraction of the insert can cause the weatherseal to warp, meaning that it becomes curved undesirably, making it less able or unable to mate to the surface or flange to which it was designed to be fitted. Second, contraction of the insert can cause it to become detached from the flexible material coating over their interfacial contact area. Depending on the geometry of the insert, as well as other unpredictable factors, this insert-to-coating separation can occur at numerous unpredictable locations over the contact area. As a result, the insert can become freed to move independently of the coating at these locations, which can result in abrasion of the coating material by the metal insert over time (e.g. resulting from repeated shutting of a door). As the coating material becomes increasingly degraded through abrasion, the seal provided by that coating can be compromised, contributing to premature failure of the weatherseal.

SUMMARY OF THE INVENTION

A core metal insert for a weatherseal is provided. The insert has opposed and longitudinally extending first and second edges, opposed first and second face surfaces extending between the first and second edges and separated by a thickness of the insert, and a first plurality of laterally extending score marks provided in the first face surface in a non-reduced-thickness portion of the insert.

A method of providing stress-relief to a core metal insert also is provided, including the following steps: a) providing a sheet metal blank having opposed and longitudinally extending first and second edges, and opposed first and second face surfaces extending between the first and second edges and separated by a thickness of the sheet metal blank; b) providing a first plurality of laterally extending score marks in the first face surface of the sheet metal blank in a non-reduced-thickness portion thereof; and c) lengthening the sheet metal blank to provide the core metal insert, wherein the first plurality of score marks provide stress relief to the core metal insert, thereby reducing its contractile tendency to contract from its lengthened state.

DETAILED DESCRIPTION OF PREFERRED EMBODIMENTS OF THE INVENTION

As used herein, a 'score mark' is a cut or incision made in a face surface of a core metal insert, or in a sheet metal blank for such an insert, that does not penetrate through to the opposite face surface of the insert or sheet metal blank. Such a cut or incision has a relatively narrow width, and can be made by lancing from the face surface so as to displace metal material to provide the score mark, which can have a width at the face surface of, for example, 0.005 inch. Such a cut or incision also typically extends from the face surface to a depth of less than 50% the total thickness of the insert or sheet metal blank in the region of the cut or incision, more preferably to a lesser depth as described hereinbelow. Conversely, a through-slit is a cut or incision that extends completely through the insert or sheet metal blank, from one face surface through to the opposite face surface. In the figures, score marks are represented by broken lines and through-slits are represented by solid lines.

Figure 5:
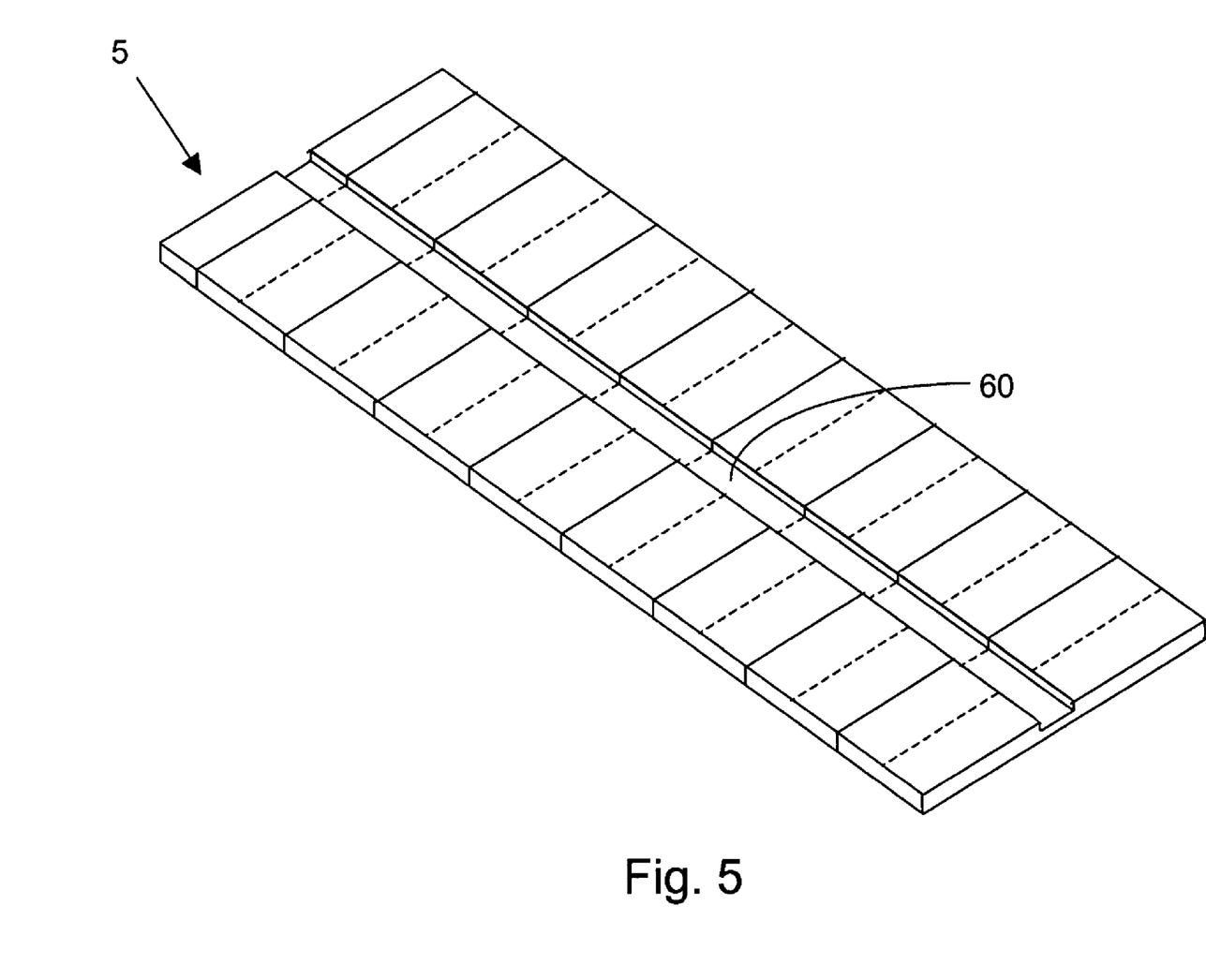
FIG. 5 shows a further embodiment of a sheet metal blank 5 that has been coined to provide a reduced-thickness portion in the form of a longitudinally extending channel or groove in a face surface.

Also as used herein, a 'reduced-thickness portion' of a core metal insert (or sheet metal blank) is a portion whose thickness between its opposite face surfaces is reduced compared to its original or prevailing thickness. Generally, the prevailing thickness of a core metal insert is the maximum thickness between its opposite face surfaces along any portion thereof, assuming the opposite face surfaces to be initially parallel in the precursor sheet metal blank. As is known, a reduced-thickness portion of a core metal insert typically, though not necessarily, is provided via coining to provide a longitudinally extending channel or groove 60 as illustrated in FIG. 5. As seen in this figure, the insert 10 has a reduced thickness in the groove 60 compared to its prevailing thickness. Conversely, a 'non-reduced-thickness portion' of a core metal insert is a portion whose thickness has not been reduced (as by coining). Therefore, a non-reduced-thickness portion retains or substantially retains the prevailing thickness of the insert.

To counteract the contractile tendency of a lengthened core metal insert after the tension drawn thereon is released, the sheet metal blank is provided with a series of score marks in at least one face surface prior to lengthening, in a non-reduced-thickness portion thereof. The score marks extend laterally, preferably but not necessarily at a 90° angle, relative to the longitudinal extent of the blank, and are spaced longitudinally from one another therein. In a preferred embodiment, the series of score marks are longitudinally spaced equidistant in the non-reduced-thickness portion, such that score marks are provided at regular intervals along the length of the respective face surface. In a further embodiment, multiple distinct series of score marks can be provided in one face surface, or in both of the opposite face surfaces, in non-reduced-thickness portions of a sheet metal blank, and therefore of the corresponding core metal insert.

The score marks sever a portion of the longitudinal metal grains in the insert, or in the blank from which the insert is made. By severing a portion of these metal grains, the contractile tendency or "shape memory" of the insert is reduced to a corresponding degree. The contractile tendency cannot be entirely eliminated by score marks, at least not so long as the insert is to remain a continuous length of metal. This is because the complete elimination of shape memory would require severing all of the longitudinal grains, essentially slicing the insert or sheet metal blank into multiple discrete pieces. However, it has been discovered that score marks in a core metal insert (sheet metal blank) can produce adequate stress relief, thus sufficiently reducing the contractile tendency of the insert, so that significant warping and insert-to-coating separation do not occur after tension in the lengthened insert has been released.

These and other features will now be further described and understood in the context of certain embodiments described below. It is to be understood, however, that the invention is not be limited to the specific core metal insert structures and geometries that follow. The use of score marks to produce stress-relief as described herein can be practiced for a wide variety of other core metal insert designs and geometries beyond those described herein, as will be understood by a person having ordinary skill in the art.

Figure 1:
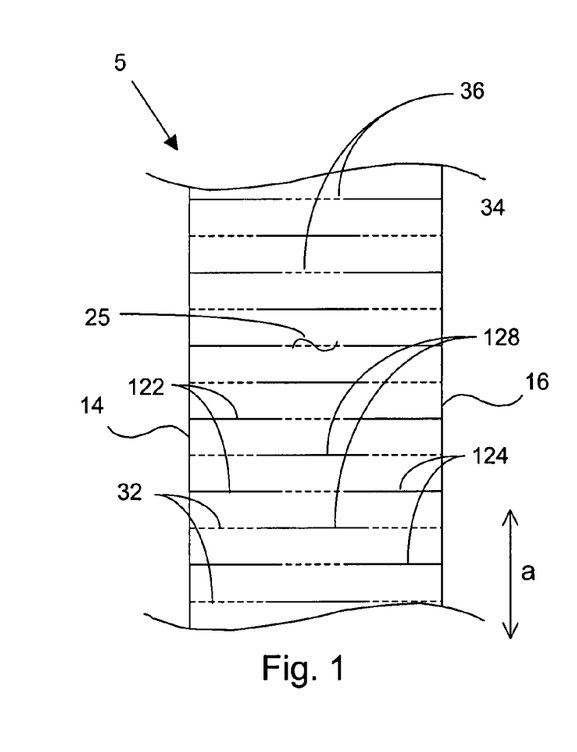
FIG. 1 shows a sheet metal blank 5 for a core metal insert that has been lanced to provide a pattern of score marks in a face surface of the blank, as well as a pattern of through-slits.
Figure 2:
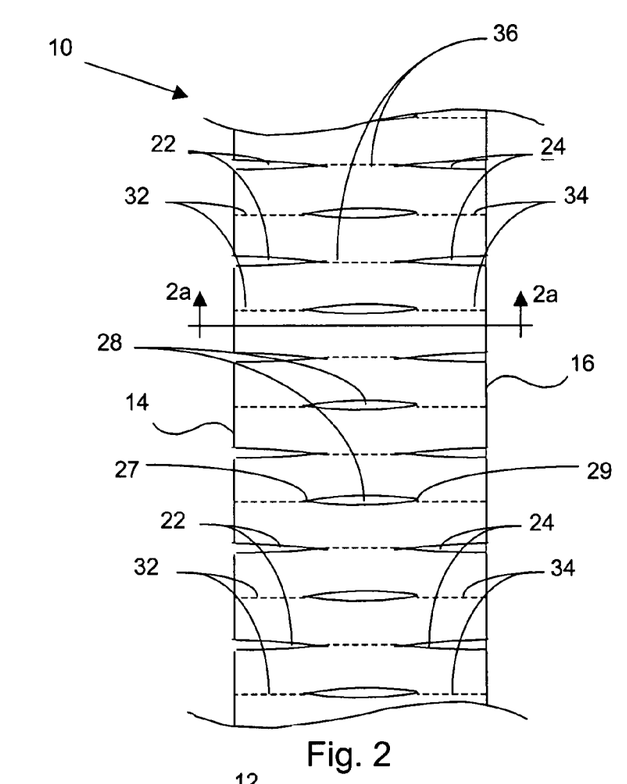
FIG. 2 shows an exemplary core metal insert 10 prior to being coated with a flexible material, prepared by stretching the blank 5 of FIG. 1.
Figure 2A:
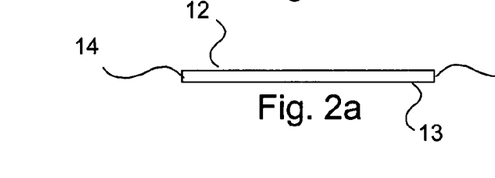
FIG. 2a is a cross-section of the core metal insert 10 taken along line 2a-2a in FIG. 2.

An exemplary core metal insert having score marks as disclosed herein is illustrated and will be understood with reference to FIGS. 1 and 2. FIG. 1 shows a sheet metal blank 5 that has been lanced to produce through-slits 122, 124, 128 and score marks 32,34,36 prior to being lengthened. In FIG. 1, all the score marks and through-slits extend at a 90° angle relative to the longitudinal extent of the insert 10 as represented by arrow "a," though this is not required. FIG. 2 shows the core metal insert 10 made by lengthening the sheet metal blank 5 in FIG. 1 to produce open slots 22 and 24 and openings 28 from the corresponding through-slits as more fully described below. Lengthening the blank 5 also results in widening the score marks in the resulting insert 10 (widening not illustrated). It will be appreciated the insert 10 in FIG. 2 is shown prior to being bent to a U- or channel-shape cross-section, and prior to being coated with flexible material.

As seen in FIGS. 1, 2 and 2b, the core metal insert 10 preferably is manufactured from a flat strip or length of material having substantially uniform thickness. That is, in the illustrated embodiment the insert 10 does not have any reduced-thickness portions, such as longitudinally extending grooves produced through coining as is known in the art. Of course, such uniform thickness (absence of coining) is not a requirement of the invention. As will become apparent, what is important is that at least a portion, preferably at least one series, of score marks are provided in at least one face surface of the insert 10 in a non-reduced-thickness (i.e. uncoined) portion thereof.

The insert 10 (sheet metal blank 5) has longitudinally extending first and second edges 14 and 16, and substantially parallel first and second face surfaces 12 and 13 opposite from one another and extending between the first and second edges 14 and 16. The face surfaces 12 and 13 are spaced apart by the thickness of the insert. The edges 14 and 16 are made discontinuous by respective series of first and second longitudinally spaced-apart slots 22 and 24 that extend laterally of the length of the insert 10. These slots 22 and 24 are formed when the blank 5 of FIG. 1 is stretched to produce the insert of FIG. 2, through opening up the respective series of through-slits 122 and 124 provided in the blank 5. In the illustrated embodiment, the first series of slots 22 is longitudinally aligned with the second series of slots 24, and each aligned pair of slots 22 and 24 are separated from one another by an associated solid central region 25 that has not been slotted. However, as illustrated, the central region(s) 25 may be provided with score mark(s) 36.

A plurality of longitudinally spaced-apart openings 28 also are provided in the insert 10. The openings 28 are located in the insert 10 substantially centrally between the opposed edges 14 and 16, in alternating sequence with the periodic and longitudinally spaced solid central regions 25 that separate aligned pairs of the slots 22 and 24. Each opening 28 extends from a first vertex 27 that defines the extent of the associated opening 28 toward the first edge 14, to a second vertex 29 that defines the extent of that opening 28 toward the second edge 16.

As seen in FIGS. 1 and 2, three distinct series of longitudinally spaced-apart and laterally extending score marks are provided in the first face surface 12 of the insert 10 (blank 5), which is the surface visible in those figures. The score marks 32,34,36 are provided in non-reduced-thickness portions of the insert 10. The first series of score marks 32 are provided adjacent the first edge 14 in alternating sequence with the first slots 22 (through-slits 122), with each of the first score marks 32 extending from the first edge 14 at one end to the adjacent first vertex 27 of an aligned opening 28 at the other end. The second series of score marks 34 are provided similarly as the first series of score marks 32, except adjacent the second edge 16, extending between that edge 16 and adjacent ones of the second vertices 29 of aligned openings 28.

The third series of score marks 36 are provided in the solid central regions 25 in alternating sequence with the central openings 28. Each of the third series of score marks 36 extends laterally between a vertex of the aligned first slot 22 at one end, and a vertex of the aligned second slot 24 at the other end.

The insert illustrated in FIG. 2 and described above is made by stretching or lengthening the sheet metal blank 5 of FIG. 1. Lengthening can be achieved via application of a tensile force as known in the art. In an alternative embodiment, if a reduced-thickness portion or groove 60 (see FIG. 5) is desired, then lengthening also can be achieved through coining to provide the groove 60 as known in the art. Both Pinch-roll compression and coining are effective to reduce the prevailing thickness of the blank 5, and to lengthen the blank 5 longitudinally to produce the resulting core metal insert 10. Lengthening the blank 5 also expands (opens up) the through-slits 122, 124, 128 therein to provide the associated slots 22, 24 and the openings 28 discussed above. The through-slits 122, 124, 128, and score marks 32, 34, 36 can be provided via any conventional or suitable method or technique. For example, they can be provided via rotary lancing, which is known in the art. Briefly, in rotary lancing a cutting die in the form of a wheel having a sharpened circumferential cutting edge is rotated about its axis, and the rotating cutting edge is brought into contact with the surface or substrate (sheet metal blank 5) to be incised or "lanced." The depth of the resulting incision can be controlled by translating the cutting die, as it is cutting, toward the substrate to a degree corresponding to the desired lance depth.

Figure 3:
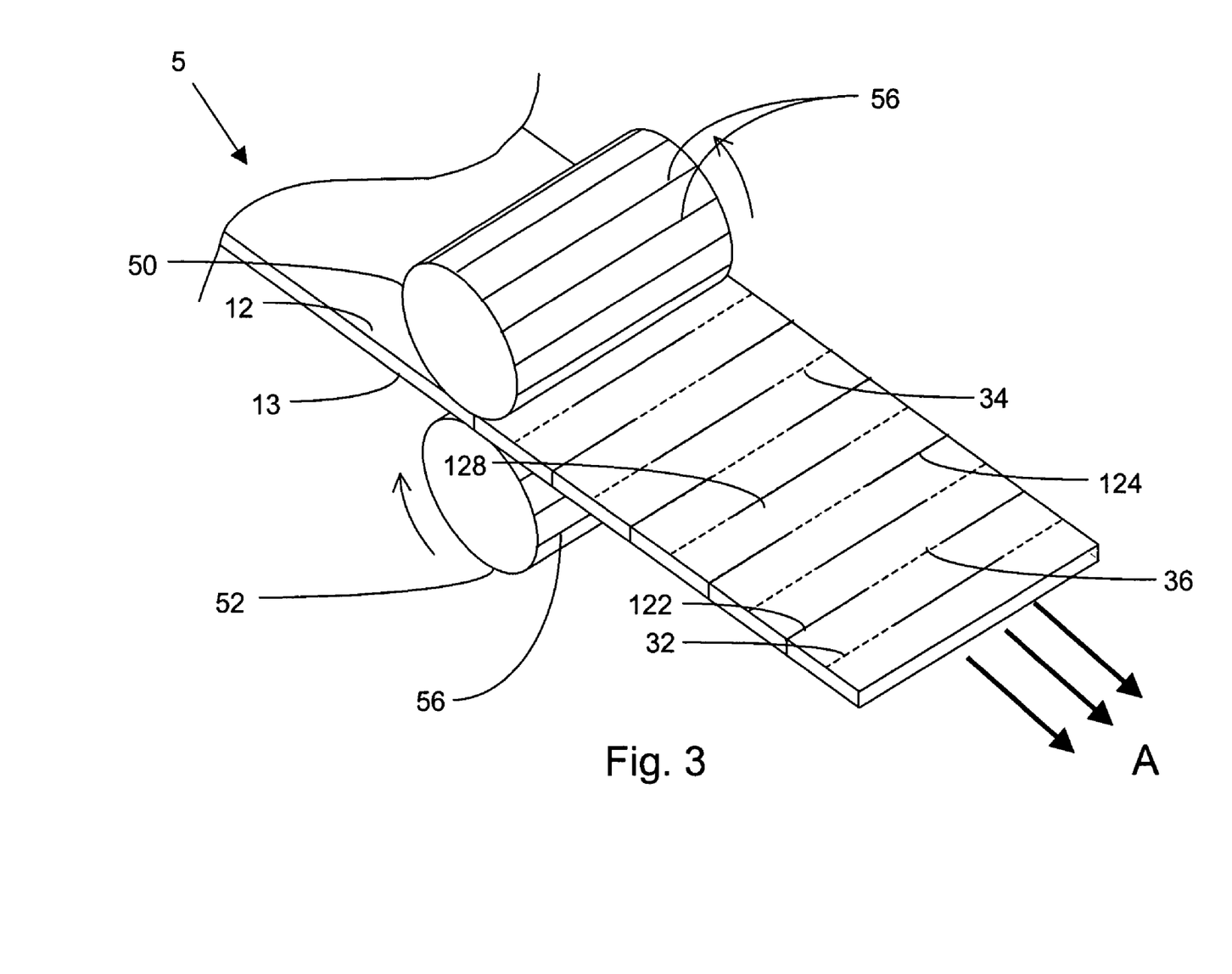
FIG. 3 is a schematic illustration of a lancing operation for providing through-slits and score marks in a sheet metal blank.

A typical lancing operation is illustrated schematically in FIG. 3. As seen in the figure, the sheet metal blank 5 is conveyed along a conveyance direction, A, past a cutting station where the blank 5 is conveyed or drawn between a pair of opposed cutting rollers 50 and 52 rotating in opposite directions as illustrated. Each of the cutting rollers 50 and 52 has an appropriate or desired pattern of cutting or lancing ribs or teeth 56 projecting from the outer circumferential surface thereof. The pattern of lancing teeth 56, including their spacing, relative height from the circumferential surface, etc., are provided to produce a sheet metal blank 5 having the desired pattern of score marks and through-slits on emerging from the nip between the cutting rollers 50 and 52 as known in the art. The cutting rollers 50 and 52 are biased toward one another with sufficient force so that as the sheet metal blank traverses the nip between then, their lancing teeth 56 are driven into the respective face surfaces 12 and 13 of the blank 5 to produce the desired pattern of score marks and through-slits. In the embodiment illustrated in FIG. 3, both cutting rollers 50 and 52 are provided with respective series of lancing teeth 56, so in this embodiment both the face surfaces 12 and 13 will be lanced. The blank is lengthened to open up the through-slits provided at the cutting station by drawing it through a subsequent pair of rollers (not shown) at a somewhat faster rate than it is conveyed through the cutting rollers 50 and 52. The result is to lengthen the blank, thereby opening up the through-slits to produce the corresponding pattern of openings and slots, e.g. as shown in FIG. 2. Other aspects of rotary lancing are well known to the industry, and will not be further explained here.

As noted above, the score marks can be provided by lancing from the adjacent face surface of the sheet metal blank 5 to a depth preferably less than 50% the total thickness of the blank. In a preferred embodiment, the score marks extend to a depth of not more than or about 25% the total thickness of the blank 5 from the adjacent face surface. More preferably, the score mark depth is in the range of 5% to 20% the total thickness of the metal blank 5, or not more than or about 20%, 15%, 10%, 8%, 6%, 5%, or 3%, of that total thickness. The width of the score marks in the metal blank can be selected through appropriate selection of a cutting die 50 having a cutting edge of suitable or corresponding dimension. As will be appreciated, where the through-slits and the score marks are provided by the same cutting die 50, their widths may be similar or substantially the same. However, the score marks may have a V-shaped cross-section due to the slant of the cutting edge, whereas the through-slits may be of substantially constant width.

After the desired pattern of through-slits and score marks has been provided in the metal blank 5, the blank is lengthened to longitudinally expand the blank to produce the core metal insert 10. This opens up the through-slits to produce the corresponding slots and openings as mentioned above. The metal blank 5 can be stretched to produce at least a 5%, 10%, or 15% length increase for the resulting core metal insert 10 compared to the metal blank 5. Alternatively, the metal blank can be lengthened to a greater or lesser extent, for example up to 100% length increase or greater, depending on the pattern of through-slits, the corresponding capacity of the blank to be stretched, the ductility of the metal blank material, etc.

To make a weatherseal reinforced by the core metal insert 10, the insert 10 (before or after bending to channel-shape cross-section) can be fed through an extrusion torpedo or coating extruder where the flexible or elastomeric material is extruded over, thereby encapsulating, the insert 10. During and as a consequence of the extrusion procedure, a longitudinally acting tensile force is applied to the insert 10 as it is drawn through the extruder, which may further lengthen the insert and which holds it in tension. If no coining is desired, then lengthening can be entirely provided through tensioning the blank/insert while it is drawn through the extruder, such that lengthening and extrusion-coating are carried out in a single operation. Otherwise, lengthening can be conducted entirely prior to extrusion-coating or partly before and partly during extrusion-coating.

Figure 4:
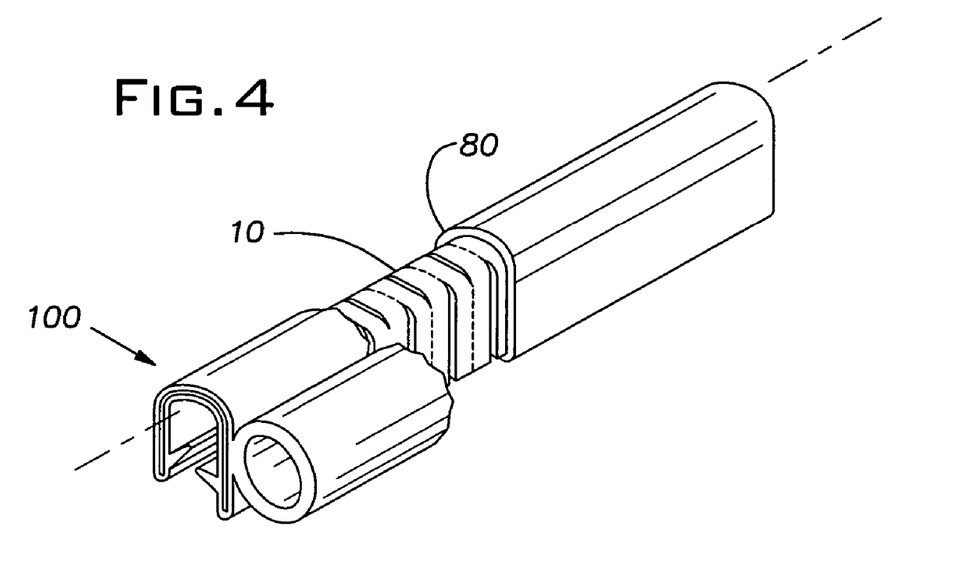
FIG. 4 shows a finished weatherseal comprising the core metal insert 10 of FIG. 2 encapsulated in an extrusion-coated flexible material. The insert 10 has been bent to a channel-shape cross-section to support the weatherseal for gripping a flange joint to hold the weatherseal in place. The coating material is shown partially broken away to illustrate features of the underlying core metal insert 10.

Following extrusion-coating, the tension in the insert 10 (now coated with the flexible coating to provide the resulting weatherseal 100, FIG. 4) is released. The score marks 32, 34, 36 provided in the insert 10 and described previously are effective to sever or break at least a portion of the longitudinal grain structure in the insert 10. By severing these metal grains, the score marks provide a measure of stress relief to the lengthened core metal insert 10 so that it does not tend, or has less tendency, to contract from its lengthened state. Otherwise, such contraction may compromise the structure or the longitudinal contour of the finished weatherseal 100 in use as explained below.

In one embodiment, score marks as described herein are provided on both face surfaces of the sheet metal blank 5 for a core metal insert in non-reduced-thickness portions thereof. For example, in the embodiment illustrated in FIGS. 1 and 2, score marks 32, 34, 36 are provided in the first face surface 12 of the blank 5 and insert 10. However, a like or analogous pattern of score marks also can be provided in the opposite, second face surface 13 such that the respective patterns of score marks provided in the opposite face surfaces are substantially in register. Alternatively, different patterns of score marks can be provided in the opposite face surfaces, at different or non-conforming locations. Providing score marks on both face surfaces of the insert 10 may ensure or promote more uniform breaking or severance of the grain structure, to provide a more uniform non-contractile (or reduced contractile) quality to the insert 10 after it is lengthened.

In the finished weatherseal 100 illustrated in FIG. 4, the core metal insert 10 encapsulated within the flexible sealing material 80 remains a substantially intact and continuous structure that has been stress relieved in its lengthened state compared to the original sheet metal blank 5. The score marks also may provide additional stress relief to the insert 10 when the finished weatherseal 100 is bent to the appropriate longitudinal contour to mate with the surface or flange to which the weatherseal, incorporating the insert, is to be fitted in use. For example, if the weatherseal 100 is to seal an automobile door frame, then its final longitudinal contour must match the shape of the door frame or the mating flange outlining the door frame.

Figure 6:
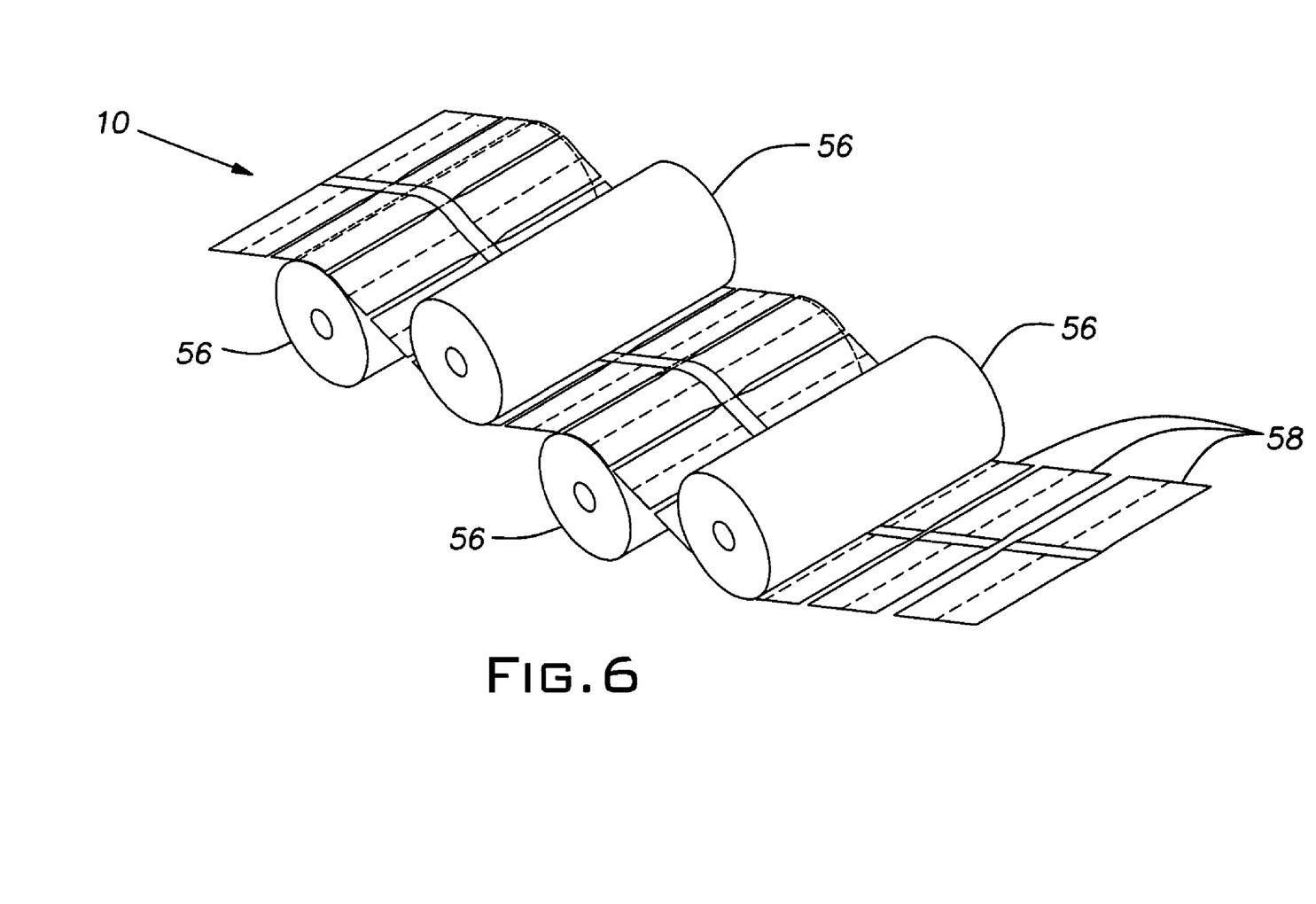
FIG. 6 schematically illustrates a process for severing a core metal insert made from the blank in FIG. 5 along score marks provided in the longitudinally extending reduced-thickness portion or groove to provide a plurality of discrete structural elements.

In a further embodiment illustrated in FIG. 5, a sheet metal blank 5 can be coined to provide a reduced-thickness portion in the form of a longitudinally extending channel or groove 60 in one or both of the face surfaces. (Coining in only one face surface is shown in FIG. 5). Laterally extending score marks then can be provided in the reduced-thickness portion or groove 60, in addition to those provided in non-reduced-thickness portions of the metal blank 5. The score marks provided in the groove 60 are effective to promote severance of the core metal insert 10, after lengthening, to produce a plurality of discrete structural elements 58 if desired. The provision of such discrete elements 58, as opposed to a continuous insert 10, results in a very flexible weatherseal. Severance of the insert along the score marks in the groove 60 can be achieved, for example, by passing it over a series of oppositely oriented and alternating rollers 56 as shown in FIG. 6, and further described in U.S. Pat. No. 6,889,985, which is incorporated herein by reference.

Conversely, the score marks provided in the non-reduced-thickness portions of the insert 10 do not significantly promote severance of the insert compared to those provided in the groove 60. Instead, they impart stress-relief to the lengthened insert 10 as above-described, thereby reducing the insert's contractile tendency following extrusion-coating but prior to severance into a multiplicity of discrete structural elements.

A core metal insert 10 as described herein can be made from any suitable or desirable or conventional material, including but not limited to cold rolled steel, stainless steel or aluminum. The dimensions of a particular insert will depend on the application, including the dimensions and required tensile strength for the required weatherseal. The following dimensions are exemplary of a typical embodiment, and are in no way limiting of the potential dimensions in which an insert 10 or a weatherseal incorporating the insert 10 can be provided.

| | |
|---|---|
| Width between edges 14 and 16: | 0.5-3.5 inches |
| Thickness (prevailing) between face surfaces 12 and 13: | 0.012-0.036 inch |
| Width of slots 22, 24: | 0.001-0.1 inch, or more (relative to longitudinal extent of insert 10) |
| Width of openings 28: | 0.001-0.1 inch, or more (relative to longitudinal extent of insert 10) |

Although the hereinabove described embodiments of the invention constitute preferred embodiments, it should be understood that modifications can be made thereto without departing from the spirit and the scope of the invention as set forth in the appended claims.

What is claimed is:

1. A method of providing stress-relief to a core metal insert, comprising the steps of:
 a) providing a sheet metal blank comprising opposed and longitudinally extending first and second edges, and opposed first and second face surfaces extending between said first and second edges and separated by a thickness of said sheet metal blank;
 b) providing a first plurality of laterally extending score marks in said first face surface of said sheet metal blank in a non-reduced-thickness portion thereof;
 c) lengthening said sheet metal blank to provide said core metal insert, wherein said first plurality of score marks provide stress relief to said core metal insert thereby reducing its contractile tendency to contract from its lengthened state; and
 d) extrusion-coating said core metal insert with a flexible material to provide a weatherseal.

2. A method according to claim 1, further comprising providing a second plurality of laterally extending score marks in said second face surface of said sheet metal blank in a non-reduced-thickness portion thereof, said second plurality of score marks providing additional stress relief to further reduce the contractile tendency of said core metal insert to contract from its lengthened state.

3. A method of providing stress-relief to a core metal insert, comprising the steps of:
 a) providing a sheet metal blank comprising opposed and longitudinally extending first and second edges, and opposed first and second face surfaces extending between said first and second edges and separated by a thickness of said sheet metal blank;
 b) providing a first plurality of laterally extending score marks in said first face surface of said sheet metal blank in a non-reduced-thickness portion thereof;
 c) providing a pattern of through-slits in said sheet metal blank; and
 d) lengthening said sheet metal blank to provide said core metal insert;
 wherein said first plurality of score marks provide stress relief to said core metal insert thereby reducing its contractile tendency to contract from its lengthened state;
 and wherein on lengthening said sheet metal blank said through-slits are opened up, thereby forming a corresponding pattern of openings and/or slots in said core metal insert.

4. A method according to claim 1, further comprising bending said core metal insert to a channel-shape cross-section.

5. A method according to claim 1, further comprising bending said core metal insert to a longitudinal contour effective to mate with a surface or flange to which said weatherseal is to be fitted in use.

6. A method according to claim 1, comprising providing said first plurality of score marks via rotary lancing from said first face surface.

7. A method according to claim 1, said first plurality of laterally extending score marks extending from said first face surface to a depth of not more than 5% the thickness of said non-reduced-thickness portion of said sheet metal blank.

8. A method according to claim 1, said sheet metal blank being lengthened at least 5% to produce said core metal insert.

9. A method according to claim 1, said insert having a substantially uniform thickness.

10. A method according to claim 1, said first and second face surfaces being substantially parallel.

11. A method according to claim 1, wherein a plurality of distinct series of laterally extending score marks are provided in said first face surface, said series of score marks all being provided in non-reduced-thickness portions of said blank.

12. A method according to claim 1, said blank comprising at least one reduced-thickness portion in the form of a longitudinally extending groove provided in said first face surface of said insert.

13. A method according to claim 12, said blank further comprising a series of laterally extending score marks provided periodically in said longitudinally extending groove.

14. A method according to claim 1, said first plurality of laterally extending score marks extending from said first face surface to a depth of less than 50% the thickness of said non-reduced-thickness portion of said sheet metal blank.

15. A method according to claim 1, said first plurality of laterally extending score marks extending from said first face surface to a depth of less than 10% the thickness of said non-reduced-thickness portion of said sheet metal blank.

16. A method according to claim 2, said second plurality of score marks extending from said second face surface to a depth of less than 25% the thickness of said non-reduced-thickness portion of said sheet metal blank.

17. A method according to claim 2, said second plurality of score marks extending from said second face surface to a depth of not more than 5% the thickness of said non-reduced-thickness portion of said sheet metal blank.

18. A method according to claim 2, said first and second pluralities of score marks being substantially in register.

19. A method according to claim 18, said first plurality of score marks extending from said first face surface to a depth of less than 25% the thickness of said non-reduced-thickness portion of said sheet metal blank, and said second plurality of score marks extending from said second face surface to a depth of less than 25% the thickness of said non-reduced-thickness portion of said sheet metal blank.

20. A method according to claim 18, said first plurality of score marks extending from said first face surface to a depth of less than 10% the thickness of said non-reduced-thickness portion of said sheet metal blank, and said second plurality of score marks extending from said second face surface to a depth of less than 10% the thickness of said non-reduced-thickness portion of said sheet metal blank.

21. A method according to claim 18, said first plurality of score marks extending from said first face surface to a depth of not more than 5% the thickness of said non-reduced-thickness portion of said sheet metal blank, and said second plurality of score marks extending from said second face surface to a depth of not more than 5% the thickness of said non-reduced-thickness portion of said sheet metal blank.

22. A method according to claim 1, further comprising providing a pattern of through-slits in said sheet metal blank such that on lengthening said sheet metal blank said through-slits are opened up, thereby forming a corresponding pattern of openings and/or slots in said core metal insert.

* * * * *

UNITED STATES PATENT AND TRADEMARK OFFICE
CERTIFICATE OF CORRECTION

PATENT NO.        : 7,604,766 B2                                                  Page 1 of 1
APPLICATION NO. : 11/283624
DATED             : October 20, 2009
INVENTOR(S)       : Roy L. Bonds It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 780 days.

Signed and Sealed this

Fifth Day of October, 2010

David J. Kappos
*Director of the United States Patent and Trademark Office*